(12) United States Patent
Yezersky et al.

(10) Patent No.: US 11,620,861 B2
(45) Date of Patent: Apr. 4, 2023

(54) SYSTEM AND METHOD FOR COMMUNICATING WITH A VEHICLE REPAIR FACILITY OR A USER OF A VEHICLE REGARDING APPROVED PARTS

(71) Applicant: ZF FRIEDRICHSHAFEN AG, Friedrichshafen (DE)

(72) Inventors: Grigory Yezersky, Farmington Hills, MI (US); Gahl Berkooz, Ann Arbor, MI (US); Rene Seidemann, Friedrichshafen (DE); Jens Hoffmann, Friedrichshafen (DE); Robert Gruetze, Ravensburg (DE); Shuvo Bhattacharjee, Windsor (CA)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 213 days.

(21) Appl. No.: 16/818,478

(22) Filed: Mar. 13, 2020

(65) Prior Publication Data
US 2021/0287456 A1    Sep. 16, 2021

(51) Int. Cl.
| | | |
|---|---|---|
| *G01M 17/00* | (2006.01) | |
| *G07C 5/00* | (2006.01) | |
| *H04W 4/90* | (2018.01) | |
| *H04W 4/44* | (2018.01) | |
| *H04W 4/12* | (2009.01) | |
| *H04W 4/029* | (2018.01) | |

(52) U.S. Cl.
CPC .............. *G07C 5/008* (2013.01); *G07C 5/006* (2013.01); *H04W 4/029* (2018.02); *H04W 4/12* (2013.01); *H04W 4/44* (2018.02); *H04W 4/90* (2018.02)

(58) Field of Classification Search
None
See application file for complete search history.

(56) References Cited

U.S. PATENT DOCUMENTS

2005/0035852 A1*  2/2005  Paulsen ................. G07C 5/085
                                                                340/572.1

* cited by examiner

*Primary Examiner* — Suhail Khan
(74) *Attorney, Agent, or Firm* — Crowell & Moring LLP

(57) ABSTRACT

A method of communicating with a vehicle repair facility includes a server receiving from a vehicle an indication that the vehicle requires repair and receiving from the vehicle communication regarding a vehicle location. The server determines a vehicle repair facility as corresponding to the vehicle location and determines contact information for the vehicle repair facility. The server then contacts the vehicle repair facility via the contact information with a message regarding repairs required for the vehicle, wherein the message includes a request for confirmation from the vehicle repair facility to verify use of authentic parts for the repairs required for the vehicle. The server can also determine user contact information for the registered user of the vehicle, and contact the registered user with a message regarding repairs required for the vehicle and a request for the user to verify use of authentic parts for the repairs required for the vehicle.

17 Claims, 13 Drawing Sheets

| Source address | Description | Destination address |
|---|---|---|
| T1M-C1 | Transfer Gear A with CID SN123456 to Vehicle with VID ABC123456 | OEM-V1 |
| T1M-C2 | Transfer Gear B with UID SN654321 to Vehicle with VID ABC123456 | OEM-V1 |
| ... | ... | OEM-V1 |

Fig. 7A

| Vehicle | Gear A | Gear B | ... | ... |
|---|---|---|---|---|
| Model A VID-ABC123456 | SN123456 | SN654321 | | |

Fig. 7B

| Source address | Action | Destination address |
|---|---|---|
| T1M-C1 | Gear A - SN123456 | OEM-V1 |
| T1M-C2 | Gear B - SN654321 | OEM-V1 |
| ... | ... | ... |
| T1M-C3 | Gear A - SN333456 Contract {if used, extend owner warranty} Contract {if used by repair shop, give rebate to repair shop} | OEM-V1 |
| OEM-V1 | Extended warranty | OEM-V1 |
| OEM-V1 | Rebate | RS-R1 |

Fig. 9A

| Vehicle | Gear A | Gear B | ... |
|---|---|---|---|
| Model A VIN-ABC123456 | SN333456 | SN654321 | ... |

Fig. 9B

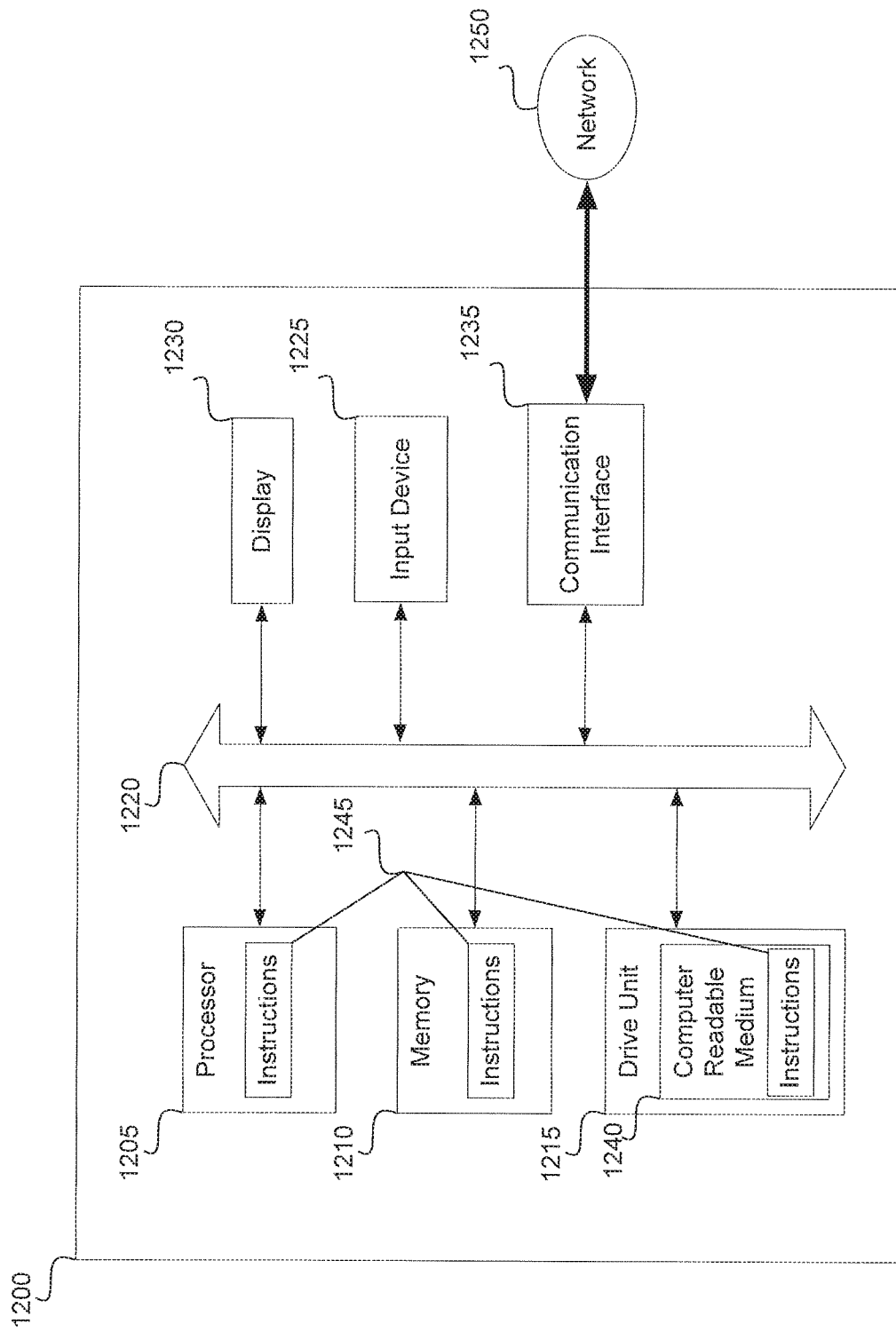

SYSTEM AND METHOD FOR COMMUNICATING WITH A VEHICLE REPAIR FACILITY OR A USER OF A VEHICLE REGARDING APPROVED PARTS

RELATED APPLICATIONS

This application is related to U.S. Provisional Application No. 62/756,436, filed Nov. 6, 2018, titled "SYSTEM AND METHOD FOR DETECTING COUNTERFEIT PARTS IN A VEHICLE," and U.S. application Ser. No. 16/666,048, filed Oct. 28, 2019, titled "SYSTEM AND METHOD FOR DETECTING NON-APPROVED PARTS IN A VEHICLE," the entirety of which are each hereby incorporated by reference herein.

BACKGROUND

Field

This application generally relates to manufacturing and maintenance processes for complex equipment. In particular, this application describes a system and method for communicating with a vehicle repair facility or a user of a vehicle regarding using approved parts when repairing a vehicle.

Description of Related Art

Original equipment manufacturers (OEMs), such as vehicle manufactures, rely on components from various suppliers in manufacturing equipment (e.g., vehicles). For example, components and raw materials may be provided by tier 1, 2, and 3 suppliers. The manufactured vehicles may be sold to dealers who in turn sell the vehicles to end users. The end-users may in turn eventually sell the vehicles to consecutive end-users.

When problems with the vehicles occur, the end users may take the vehicles to a repair shop, which may be operated by the dealer or by a third party. In some cases, repair of the vehicle may require replacement of a part. The repair shop may obtain the replacement part from the OEM or directly from an approved supplier of the OEM, or from other third-party sources.

Unfortunately, to save costs, some repair shops may obtain replacements parts from non-approved suppliers (i.e., suppliers that have not been approved by the OEM). The non-approved part may be produced by a supplier using the brand of the supplier. The non-approved part may be produced by a supplier in the aftermarket that produces non-approved or counterfeit parts/components and sells the components to the repair shops. In some instances, the non-approved parts may not be entirely compatible with the vehicle and, as such, may be misfit parts. For example, the part may not be rated to handle the environment in which it is placed. The part may be manufactured using inferior techniques. These and other issues with non-approved parts may result in non-operation of the part as required, or an earlier failure of the part and/or the vehicle. In some cases, use of non-approved parts may raise safety concerns that could put lives at risk.

Often, such inferior non-approved parts are installed by such repair shops without the knowledge of the owner of the vehicle or the OEM. This can present safety issues for owners or users of the vehicle. Further, use of such non-approved parts can result in a decrease in overall quality of the vehicle, an inability to file warranty claims, inconvenience (e.g., if such inferior parts fail again), and financial loss (e.g., to replace inferior parts). Further, for the OEM, use of such inferior non-approved parts can result in damage to the OEM's reputation, loss of part sales, and excessive expenditures on legal actions (e.g., due to failure of non-approved parts).

BRIEF SUMMARY

In one aspect, a method of communicating with a vehicle repair facility includes a server receiving from a vehicle an indication that the vehicle requires repair and receiving from the vehicle communication regarding a vehicle location. The server determines a vehicle repair facility as corresponding to the vehicle location and determines contact information for the vehicle repair facility. The server then contacts the vehicle repair facility via the contact information with a message regarding repairs required for the vehicle, wherein the message includes a request for confirmation from the vehicle repair facility to verify use of authentic parts for the repairs required for the vehicle.

In another aspect, a method of communicating with a registered user of a vehicle includes receiving, by at least one server from a vehicle, an indication that the vehicle requires repair. The server then determines user contact information for the registered user of the vehicle, and contacts the registered user of the vehicle via the user contact information with a message regarding repairs required for the vehicle, wherein the message includes a request for the registered user of the vehicle to verify use of authentic parts for the repairs required for the vehicle.

BRIEF DESCRIPTION OF THE DRAWINGS

FIG. 7A illustrates exemplary transactions that may be generated by the OEM system to associate one or more components with a vehicle;

FIG. 7B illustrates and exemplary listing of parts that may be associated with the vehicle upon processing the transactions of FIG. 7A;

FIG. 9A illustrates additional exemplary transactions that may be generated based on the operations of FIGS. 8A and 8B;

FIG. 9B illustrates and exemplary listing of parts that may be associated with the vehicle upon processing the transactions of FIG. 9A;

FIG. 12 illustrates an exemplary computer system that may form part of or implement the systems described in the figures or in the following paragraphs

DETAILED DESCRIPTION

Figure 1:
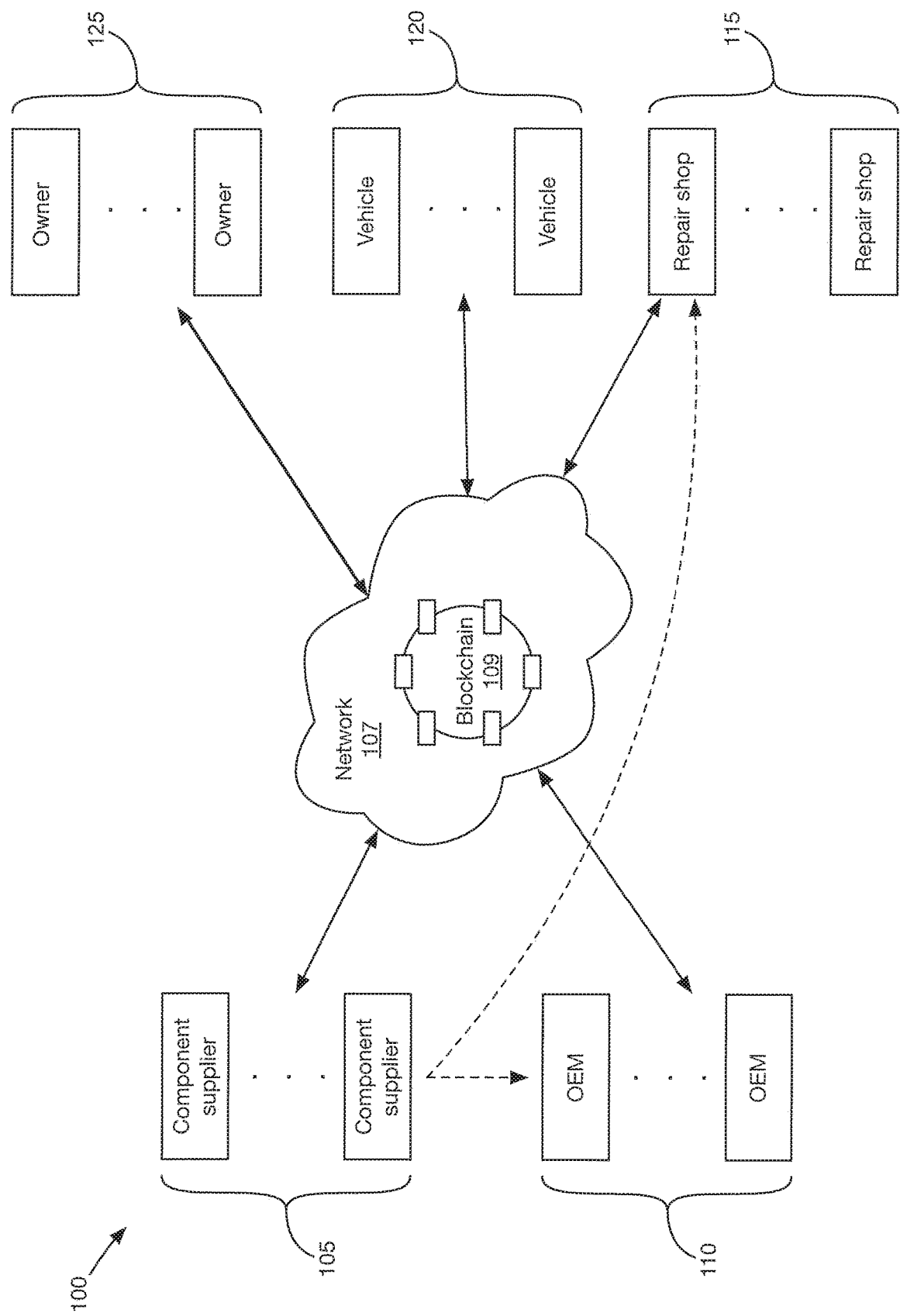
FIG. 1 illustrates an exemplary environment that facilitates detecting non-approved parts in a vehicle.

The embodiments described below overcome the problems discussed above by providing a system and methods that provide communication to registered users or owners of vehicles and/or repair shops (e.g., vehicle repair facilities) to notify the user or repair shop of a requirement or recommendation to utilize approved replacement parts in the vehicle. Further, such communication can encourage or require action on part of the user or the repair shop to validate that any replacement parts used during the repair of the vehicle are indeed authentic approved replacement parts. In doing so, the user or owner of the vehicle and the OEM may be provided with the knowledge that any replacement parts required for the vehicle are authentic approved replacement parts. Alternatively, in the instance where no such validation occurs, the user or owner of the vehicle and the OEM can be made aware that non-approved parts may have been installed in the vehicle.

In various approaches, the OEM may be made aware that a vehicle repair may be required. For example, the vehicle can communicate the need for repair to the OEM, which may be the result of an accident or a detected issue with the vehicle. Additionally, in certain approaches, the OEM may receive location information (e.g., GPS location information) from the vehicle corresponding to the vehicle's location. The OEM may then monitor the vehicle location and determine that the vehicle has been taken to a repair shop based on map or other database data. The OEM may then determine contact information for the repair shop, and may initiate contact with the OEM regarding the repairs to be made to the vehicle and to request confirmation and verification that any replacement parts used during the repair of the vehicle are indeed authentic approved replacement parts.

Further, in advancement of the above functions, the system may maintain component and vehicle information in a decentralized database. Components specified in the decentralized database are manufactured by OEM approved suppliers. Vehicles manufactured by the OEM are given and identified by unique IDs, which are linked to unique component IDs in the decentralized database. Determining whether a non-approved component is installed in the vehicle is based in part on information in the decentralized database. In one implementation, detection and verification that authentic parts have been installed in the vehicle may be accomplished by a repair shop or the vehicle owner. For example, a repair shop or the vehicle owner may utilize a scanner device or other system to scan or take a picture of a bar code, QR code, RFid tag, etc., of the part/component. The system may check whether a part associated with the scanned information is specified in the decentralized database. If not, the component may be determined to be non-approved and non-authentic.

In some implementations, when a non-approved component is detected, or when a repair shop fails to provide confirmation or verification that the parts used are authentic, an alert may be communicated to the vehicle to alert an owner of the vehicle that non-approved or non-authentic parts may have been used in the repair of the vehicle. For example, the vehicle may display to the user or owner an indication, for example, on an infotainment system of the vehicle, that non-approved and/or non-authentic parts may have been utilized in the repair of the vehicle. Similarly, the system may determine contact information for a registered user or owner of the vehicle and may contact them to inform them that the repair shop has failed to verify that any parts used in the repair were authentic approved parts. In some cases, instructions to deactivate the vehicle if a safety concern is detected may be communicated to the vehicle. The vehicle may then adjust parameters of the vehicle accordingly.

FIG. 1 illustrates an exemplary environment 100 that facilitates detecting non-approved parts in a vehicle. Illustrated in the environment 100 are entities that include component supplier systems 105, original equipment manufacturers (OEMs) systems 110, repair shops systems 115, vehicle systems 120, and owners or users 125.

In the auto industry context, component supplier systems 105 may be operated by component suppliers (e.g., tier 1 suppliers). In this regard, the component suppliers may specialize in making "automotive-grade" hardware. That is, hardware that withstands the forces, motion, temperature, and longevity demands of OEMs. For example, the component suppliers may supply motors, transmissions, engine control modules, seats, windows, and any other of a myriad of components that may go into the manufacture of an automotive vehicle. The component supplier systems 105 may include, for example, one or more servers or other networked systems or devices.

The OEM systems 110 may correspond to systems operated by OEMs such as GM, Ford, Mercedes Benz, etc. For cost and efficiency, the OEMs may contract with various components suppliers to provide components needed by the OEM to manufacture an end product such as automotive vehicle. The OEM systems 110 may include, for example, one or more servers or other networked systems or devices.

The repair shop systems 115 may correspond to systems (e.g., servers and/or other devices) operated by repair shops (e.g., vehicle repair facilities) such as automotive dealers and independent repair shops. Automotive dealers may sell automobiles of various makes and models and may provide onsite facilities for repairing the same. The automotive dealer may include a parts department that stocks various replacement components for the vehicles. The replacement components may be OEM components. That is, components certified by the OEM as being a suitable replacement for an existing component in a vehicle. Other replacement components may not be certified and may be provided as an alternative to components certified by the OEM to save costs and/or when the lead times in obtaining a certified component is too high.

The vehicle systems 120 may correspond to computer systems of vehicles manufactured by OEMs from parts provided by the component suppliers. The vehicles may be operated by end users or fleet provider companies. That is, the vehicle may be operated by both end users/customers and companies that operate a fleet of vehicles (e.g. to provide mobility as a service).

The owner or user systems 125 may correspond to computer systems or devices (e.g., mobile devices) of users or owners of vehicles. The owners or users may be registered users of vehicles manufactured by one or more OEMs. The OEMs may maintain a database that links registered users (including their contact information) to individual vehicles. More than one user or owner may be registered to a vehicle in various embodiments.

As described in more detail below, one or more of the systems (105, 110, 115, 120, and 125) may include various hardware components that facilitate interactions and communications with one another, for example, via a wired or wireless network 107 (e.g., the Internet). In certain examples, the OEM systems 110 comprise servers or other systems, which may communicate with one or more of the repair shop systems 115 (e.g., servers or devices), the vehicle system 120 (e.g., the vehicle computer system), and/or the user systems 125 (e.g., user devices), and vice versa. Further, these systems may include an ability to interact with a decentralized database 109 such as a block-chain decentralized database.

Figure 2:
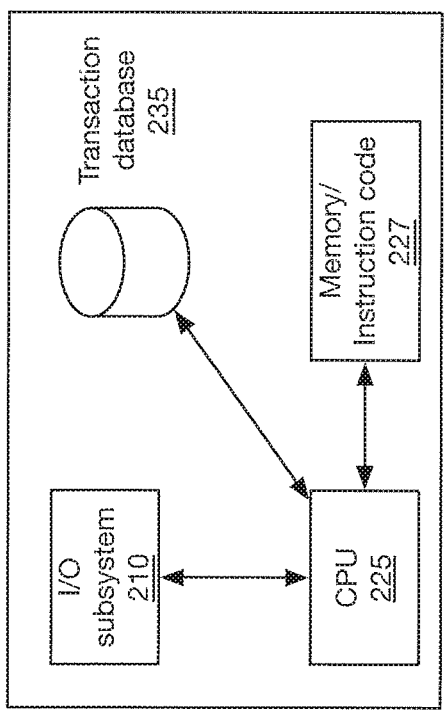
FIG. 2 illustrates an exemplary schematic diagram of various hardware components that may be included in one or more systems of the environment to facilitate interactions with a decentralized database.

FIG. 2 illustrates an exemplary schematic diagram of various hardware components that may be included in the systems (105, 110, 115, 120, and 125) to facilitate interactions with other systems and/or the decentralized database. Referring to the diagrams, each system may include one or more central processing unit (CPU) 225 or other processing device, input/output subsystem 210, and instruction code memory 227. Additionally, as is shown in FIG. 12, each system may also include one or more input devices 1225, which may enable the system to interact with a user or repair shop, and may enable reception of part identification information, such as barcodes, QR codes, or RFID codes.

In various embodiments, one or more systems may also include a distributed transaction database 235. For example, the component supplier systems 105 and OEM systems 110 may include a distributed transaction database 235. On the other hand, the repair shop systems 115 and vehicle systems 120 may interact with a distributed transaction database 235 of one of the other systems rather than include a distributed transaction database 235. Additionally, in various embodiments, the systems may maintain other databases. For example, the OEM system 110 may maintain one or more databases of vehicles, registered users of vehicles, contact information for registered users of vehicles, repair shops, contact information for repair shops, and geographical locations of repair shops. In some embodiments, the OEM system 110 may not directly maintain some of these databases, but may have access to them. For example, with respect to repair shop contact information and geographical location information, the OEM system 110 may interact with another third-party system to access such databases.

The I/O subsystem 210 of each system (105, 110, 115, 120, and 125) facilitates communications with other systems (105, 110, 115, 120, and 125) of the environment 100. In this regard, the I/O subsystem 210 may implement an API such as a SOAP-based web services API to facilitate communicating information to the other systems (105, 110, 115, 120, and 125). Other APIs, such as a RESTful API, may be implemented to facilitate communications between systems (105, 110, 115, 120, and 125). Additionally, the systems (105, 110, 115, 120, and 125) may implement other traditional forms of communication with other systems (105, 110, 115, 120, and 125), such as email messages, text or SMS messages, and/or phone calls. For example, the OEM systems 110 may be able to communicate with the repair shop systems 115 and the owner systems 125 via any of these known communication mediums. Additionally, in other examples, the repair shop systems 115, vehicle systems 120, and/or the owner systems 125 may execute and implement certain applications, for example, proprietary applications for the OEM. The OEM systems 110 may be able to send messages via such proprietary applications to the repair shop systems 115, the vehicle systems 120 and/or the owner systems 125. Many variations are possible.

The I/O subsystem 210 may be configured to dynamically determine the communication methodology utilized by other systems (105, 110, 115, 120, and 125) of the environment 100 and to communicate information to the other systems (105, 110, 115, 120, and 125) using the determined communication methodology. For example, the I/O subsystem 210 may determine that a first entity utilizes a RESTful API and may, therefore, communicate with the entity using a RESTful communication methodology.

The I/O subsystem 210 may implement a web browser to facilitate generating one or more web-based interfaces or screenshots that facilitate user interactions with the respective systems (105, 110, 115, 120, and 125). In this regard, web services may be implemented to facilitate automating some of the web-based functionality via a computer. For example, OEM system 110 and/or component supplier systems 105, which may comprise one or more servers, may provide such web-based interfaces that facilitate user interactions by repair shop systems 115 and/or owner systems 125.

The CPU 225 executes instruction code stored in a memory device 227 for coordinating activities performed between the various subsystems. The CPU 225 may correspond to an Intel®, AMD®, ARM® based CPU or a different CPU. The CPU may perform instructions according to an operating system such as Linux or a different operating system.

In various embodiments, records in the transaction databases 235 of each system are replicated with one another and collectively form a decentralized database that may correspond to a block-chain database. In this regard, the block-chain database may be utilized as a way to construct consensus around the validity of transactions, and to ensure that all changes are auditable. Stated differently, the block-chain database corresponds to a record of consensus with a cryptographic audit trail that is maintained and validated by each system. Block chains of the block-chain database act as a way to record the order of, and validate the transactions in, the block-chain database. As will be described below, the block chains further facilitate value transfer between the parties—without the usual requirement for a trusted third party. Moreover, such a database facilitates the implementation of smart contracts (e.g. for business rules) that automate processes on such a database (e.g. for defining & delivering incentives to different parties in the supply chain).

It is contemplated that any of the systems described above and/or any subsystem thereof may correspond to a standalone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, etc.

Figure 3:
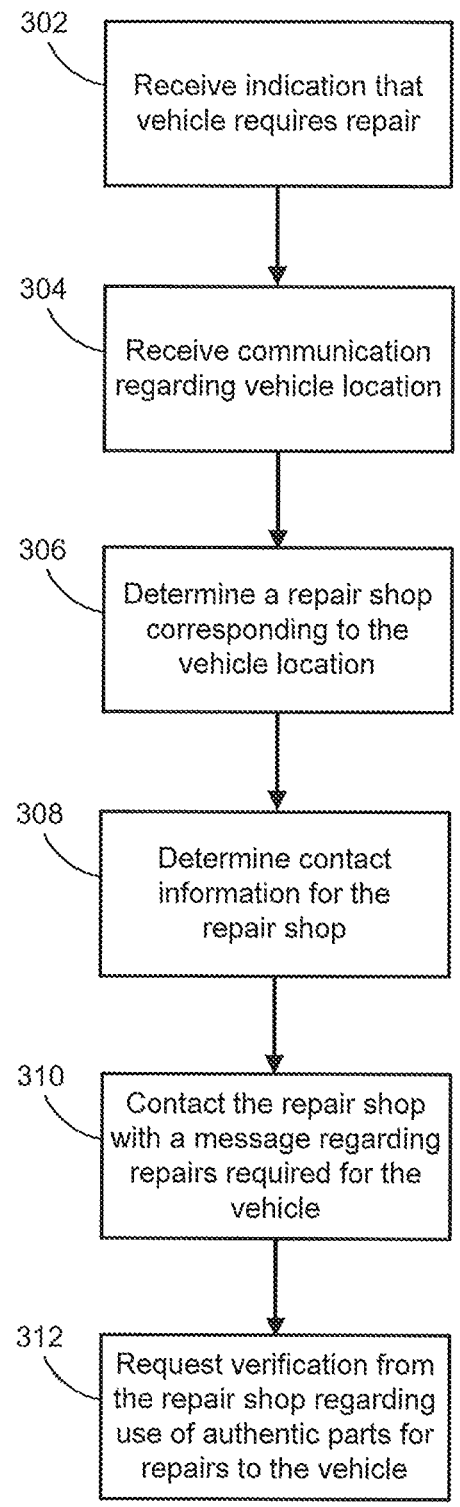
FIG. 3 illustrates exemplary operations that may be implemented by a system.

FIG. 3 illustrates exemplary operations that may be performed by the system, and in a particular example, by the OEM systems 110, e.g., the OEM servers. In various approaches, the operations comprise a method of communicating with a repair shop (e.g., vehicle repair facility). In various embodiments, at 302, at least one server (e.g., of a system, e.g., OEM system 110) receives from a vehicle (e.g., from a vehicle system 120) an indication that the vehicle requires repair. The vehicle, through its vehicle system 120, may transmit to the server (e.g., OEM system 110) via the networks 107 a message indicating a need for repair of the vehicle or a status update that may be interpreted by the server as a requirement for repair of the vehicle. For example, the vehicle may transmit this message or data via a cellular network, a Wi-Fi network, or a Bluetooth network to which the vehicle system 120 is connected, which message is then relayed to the destination server.

In various embodiments, the vehicle may determine a need for a repair based on data received from vehicle sensors or other diagnostic means that indicate a part or a system of the vehicle is damaged or malfunctioning. In response to receiving this sensor or diagnostic information, the vehicle can transmit a message to the server indicating the repair is required.

Alternatively, the vehicle can transmit a message, and the server can receive a message indicating that the vehicle has been in an accident as the message indicating the repair is required. The vehicle may make the determination that it has been involved in an accident based on one or more indications, for example, after determining that an airbag has deployed, or in response to receiving accelerometer data that indicates an accident has occurred. Similarly, the vehicle may transmit an indication that at least one airbag of the vehicle has deployed as the message indicating the repair is required.

At 304, the server receives from the vehicle communication regarding a vehicle location. In various embodiments, this vehicle location corresponds to a location of the vehicle repair facility. For example, if a vehicle has been towed or otherwise relocated to a repair shop, and if the vehicle's transmitter system is still operational or powered, the vehicle may transmit its location via the networks 107 to the server (e.g., to the OEM system 110). This transmission may be periodic or in response to a request. The transmission may include GPS information corresponding to the vehicle's geographic location, which may be generated by the vehicle's navigation or GPS system. Alternatively, the server may receive location information for the vehicle via a user device of the owner or user of the vehicle. For example, if the owner's user device is paired to the vehicle, e.g., via Bluetooth, the user device may know the approximate location of the vehicle, or its last parked location, and can transmit such information to the server.

At 306, the server (e.g., the OEM system 110) may determine a repair shop (e.g., vehicle repair facility) corresponding to the vehicle location based on the vehicle location information. For example, the server may compare the received vehicle location information to a known database of repair shops. Similarly, the server may utilize a third party service (e.g., Google Maps, etc.) to determine a repair shop that corresponds to the vehicle location information. In various embodiments, the identified repair shop may be the closest repair shop to the location of the vehicle. In various approaches, the server may utilize a threshold distance (e.g., 300 feet, an ⅛ of a mile, etc.) from the vehicle location to determine the identified repair shop, thereby excluding any repair shop that is outside of the that threshold distance.

Once the candidate repair shop is identified, the server (e.g., OEM system 110) may, at 308, determine contact information for the identified repair shop. The server may utilize a database to determine contact information for a known repair shop, such as the database discussed above. Alternatively, the server may utilize a third part service (e.g., Google Maps) to determine contact information for the repair shop. The contact information may include, for example, an email address, a phone number, or a street address for the repair shop. If the repair shop has a profile associated with a software system utilized or provided by the OEM system 110, the component suppliers 105, or another associated software system, the server may determine that the contact information for the repair shop may be the known profile or address for communication of the repair shop within that software system (e.g., via a messaging subsystem of that software system).

With the contact information for the repair shop determined, the server, at 310 may contact the vehicle repair facility using the contact information. The server may provide a message regarding repairs required for the vehicle. For example, the message may inform the repair shop of a need to utilize authorized and authentic parts in the repair of the vehicle. As shown at 312, the message may also include a request for confirmation from the vehicle repair facility to verify use of authentic parts for the repairs required for the vehicle. Further, the message may request that the repair shop confirm that it will utilize authentic repair parts in the repair of the vehicle, and also may request the repair shop provide verification (e.g., via the scanning method discussed herein) that such authentic components are provided.

In various embodiments, the message is an email message to the repair shop. The email message may include text and a link to a webpage where an employee of the repair shop can interface with a software system of the OEM system 110 or the component supplier 105 to provide such confirmation and/or verification information regarding the use of authentic approved parts for the repair of the vehicle. Alternatively, the message may comprise an automated phone call or a live phone call (e.g., with a customer service member) placed to the phone number of the repair shop and providing the same or similar information to the recipient as the email message discussed above. Similarly still, the message may comprise a physical letter mailed to a mailing address of the repair shop, including similar information discussed above. Additionally, the message may comprise a message sent via a software system provided or utilized by the OEM system 110 or the component supplier 105 for which the repair shop has already joined and has a profile. As will be understood, the actual content and format of the message may be varied. However, the purpose of the message is to inform the repair shop that the sender of the message is aware that the vehicle is located at that repair shop for repairs, and to impress upon employees of the repair shop that a response is expected regarding the use of authentic approved parts in the repair of the vehicle. In providing such a message, the use of non-approved and/or non-authentic parts may be reduced.

Figure 4:
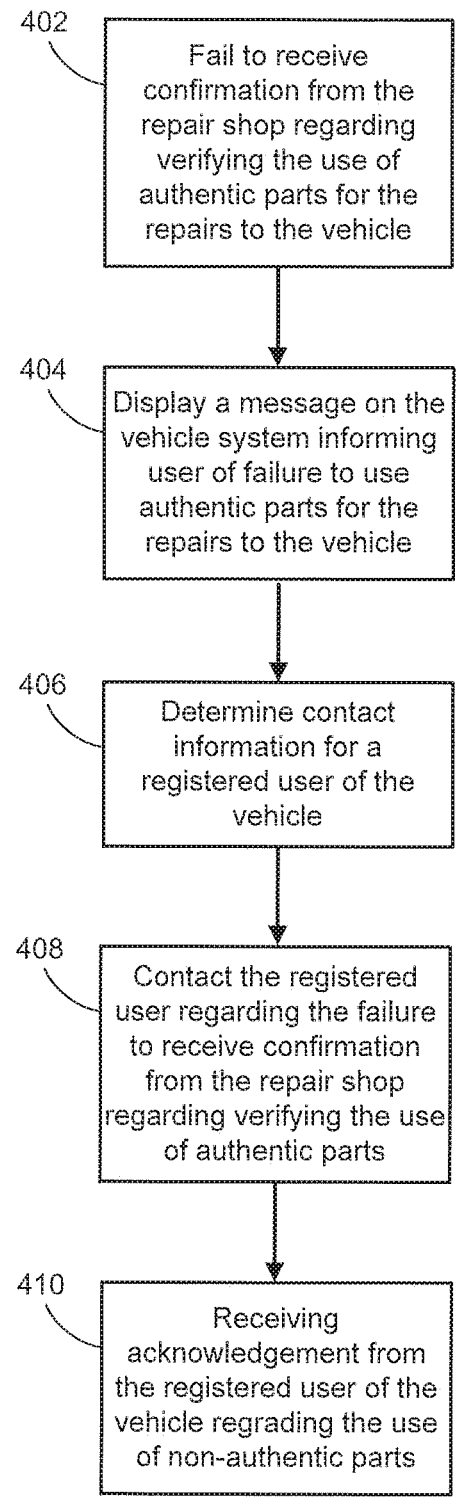
FIG. 4 illustrates other exemplary operations that may be implemented by a system.

Turning to FIG. 4, other exemplary operations that may be performed by the system, and in a particular example, by the OEM systems 110, e.g., the OEM servers, are illustrated. In various approaches, the operations comprise a continuation of the method of communicating with a repair shop (e.g., vehicle repair facility) discussed above. Further, some operations may be performed in concert with a method of communicating with a registered user of a vehicle, as is discussed in further detail below.

At 402, the server (e.g., the OEM system 110) determines that it fails to receive a confirmation from the repair shop (e.g., vehicle repair facility) regarding verifying the use of authentic parts for the repairs required for the vehicle. For example, the repair shop may fail to respond to a message sent to the repair shop, as discussed above. The failure may include a failure of the repair shop to confirm that they are using authentic authorized parts for the repair of the vehicle. Similarly, the failure may include a failure of the repair shop to provide verification to the server of the authenticity of the parts being used (e.g., by failing to perform the scanning operations discussed below). Such a failure may be determined after expiration of a threshold time, for example, after 3 days, 1 week, or 1 month. The server may store a log of the failure to receive the confirmation from the vehicle repair facility regarding verifying the use of authentic parts for the repairs required for the vehicle in a database associated with the vehicle and the vehicle repair facility.

At 404, in response to failing to receive a confirmation or verification from the repair shop, the server may cause a message to be output on an interface of the vehicle regarding the failure of the vehicle repair facility to verify the use of authentic parts for the repairs required for the vehicle. Such a message may be displayed on an infotainment system of the vehicle or played through an audio system as a warning to the vehicle user or owner that the vehicle may contain non-authentic and/or non-approved parts. Such a message can be displayed or output repeatedly, for example, every time the vehicle is started, or once a day. The message can be displayed fora set time (e.g., for 1 or 2 months) or fora set number of times (e.g., 10 times), after the expiration of which, the message may no longer be displayed. The message can be displayed with a request for confirmation that the user received the message and/or that the user acknowledges that non-authentic and/or non-approved parts may have been used in the repair of the vehicle.

Alternatively, or additionally, the server (e.g., the OEM system 110) may contact a registered user of the vehicle regarding the failure to verify the use of authorized or authentic parts. For example, at 406, the server may determine user contact information for a registered user of the vehicle. The server may utilize a database of known registered users that are indicated as associated with the vehicle.

Then, at 408, the server may contact the registered user of the vehicle via the determined user contact information to deliver a message. The message may communicate to the registered user the failure of the server to receive a confirmation and/or verification from the vehicle repair facility regarding verifying the use of authentic parts for the repairs required for the vehicle.

As with the contact information of the repair shop, the contact information of the registered user may include various means of contact. In various embodiments, the message to the registered user is an email message. The email message may include text and a link to a webpage where the registered user can interface with the software system of the OEM system 110 or the component supplier 105 to receive information regarding the failure of the repair shop to provide such confirmation and/or verification information regarding the use of authentic approved parts for the repair of the vehicle. Alternatively, the message may comprise an automated phone call or a live phone call (e.g., with a customer service member) placed to the phone number of the registered user and providing the same or similar information to the recipient as the email message discussed above. Similarly, the message may comprise a physical letter mailed to a mailing address of the registered user, including similar information discussed above. Additionally, the message may comprise a message sent via a software system provided or utilized by the OEM system 110 or the component supplier 105 for which the registered user has already joined and has a profile. As will be understood, the actual content and format of the message may vary. However, the purpose of the message is to inform the registered user of the importance to utilize authentic and authorized repair parts, and that the repair shop has failed to confirm and/or verify that such authentic or authorized parts were used in the repair of the vehicle.

It is noted that some users or owners of vehicles may be content with and/or may have requests unauthorized or non-approved parts to be used, for example, possibly in an effort to save money or to intentionally customize or modify the vehicle. In such a case, as is shown at 410, the server may receive an acknowledgment from the registered user of the vehicle regarding the use of non-authentic parts for the repairs required for the vehicle. For example, the registered user may provide such acknowledgment in response to a communication sent to the registered user. Similarly, the registered user may provide such acknowledgment in response to a message output or displayed by the vehicle, as discussed above (e.g., by pressing a button on the infotainment center). In such a case, the server may receive, from the vehicle, an acknowledgment that a vehicle user has read the message displayed on the infotainment system of the vehicle regarding the failure of the vehicle repair facility to verify the use of authentic parts for the repairs required for the vehicle. The server may then store a log of the receipt of the acknowledgement. By this, in one example, if a warrantee claim for the non-approved part or a system associated with the non-approved part is issued for the vehicle, the OEM may verify that the warrantee for the part or system has not been voided by the use of non-authorized parts.

Figure 5:
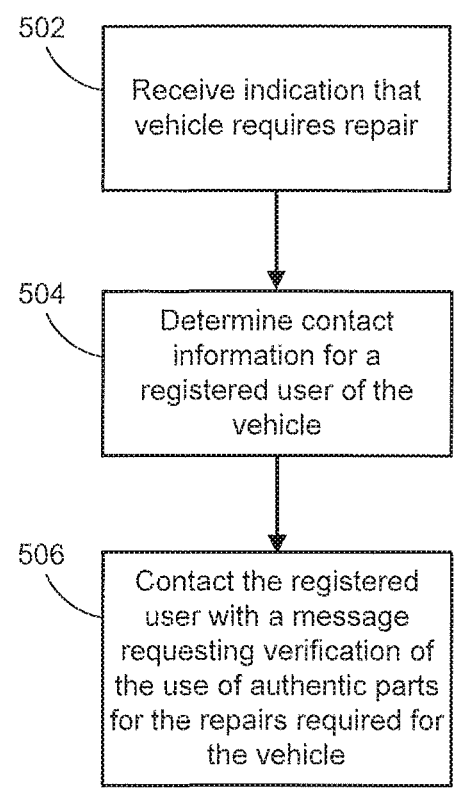
FIG. 5 illustrates exemplary operations that may be implemented by a system.

Turning to FIG. 5, other exemplary operations that may be performed by the system, and in a particular example, by the OEM systems 110, e.g., the OEM servers, are illustrated. In various approaches, the operations comprise a method of communicating with a registered user of the vehicle. Further, some operations may be performed simultaneously with or separate from one or all of the steps of the method of communicating with the repair shop as is discussed above in reference to FIGS. 3 and 4. In this alternative or additional embodiment, the server (e.g., the OEM system 110 or the component supplier system 105) attempts to communicate with the registered user of the vehicle to inform them of the importance to utilize authentic and authorized replacement parts in the repair of their vehicle. The server may request that the user perform the parts verification process (e.g., scanning the replacement parts) themselves, for example, using their phone or another device.

At 502, the at least one server receives from the vehicle the indication that the vehicle requires repair. This process in step 502 may be identical to the process discussed with respect to step 302, discussed above.

Then, at 504, the server may determine user contact information for the registered user of the vehicle. The server may utilize a database of known registered users that are indicated as associated with the vehicle. This process may be identical or similar to the process in step 406, discussed above.

At 506, the server may contact the registered user of the vehicle via the determined user contact information to deliver a message. Such contact may occur as was discussed above with respect to step 408, for example, using email, phone, physical mail, and/or via a software application. The message be with regards to the repairs required for the vehicle, and may include a request for the registered user of the vehicle to verify the use of authentic parts for the repairs required for the vehicle. For example, the message may encourage or require the registered user to request that the repair shop comply with the verification process and/or to go to the repair shop and scan the replacement parts themselves to complete the verification process. Further, as discussed above, the message may also communicate to the registered user the failure of the server to receive a confirmation and/or verification from the vehicle repair facility regarding verifying the use of authentic parts for the repairs required for the vehicle. If the registered user fails to act on the request to perform the verification procedure, or fails to even acknowledge the request, the server may determine (for example, after a preset time or a preset number of communication attempts) a failure to receive an acknowledgement from the registered user of the vehicle regarding the request for the registered user of the vehicle to verify use of authentic parts for the repairs required for the vehicle. The server may then store a log of the failure to receive the acknowledgement.

Although many of the embodiments discussed above involve a failure on the part of the repair shop and/or user to provide verification that replacement parts used in the repair of a vehicle are approved and/or authentic, there are hopefully more instances where the repair shop or user does provide such verification. If the repair shop or the user receives and responds to the messages discussed above, the repair shop or the user may perform an action to verify that an approved and/or authentic part is being utilized in the repair of the vehicle.

As is discussed in more detail below, an employee of the repair shop, or the registered user or owner of the vehicle himself, can scan identifying marks (e.g., barcodes, QR codes, RFID codes, etc.) that are on or part of the replacement parts with a scanning device. The scanning may occur prior to, during, or shortly after installation of the replacement part into the vehicle. The scanning may comprise taking a picture or using an imaging sensor to capture images of the identifying marks on the replacement part. The identifying marks may correspond to a serial number or other identification of the replacement part. The scanning device may comprise a user device (e.g., a smartphone, tablet, or other mobile device) or a dedicated scanning device or tool of the registered user or the repair shop.

The server (e.g., OEM system 110 or component supplier system 105) may receive from the scanning device (e.g., via the networks 107) the scanned information correlating to the replacement part for the vehicle. The server may then perform a process to determine whether the scanned information is associated with an authentic part, which is discussed in further detail below. The server may then store in a database a result of the determination of whether the scanned information is associated with an authentic part. For example, if the part is authentic and approved, then such a result is stored as associated with the replacement part and the vehicle. However, if the part is unauthentic or non-approved, then such a result is stored as associated with the replacement part and the vehicle.

Figure 6:
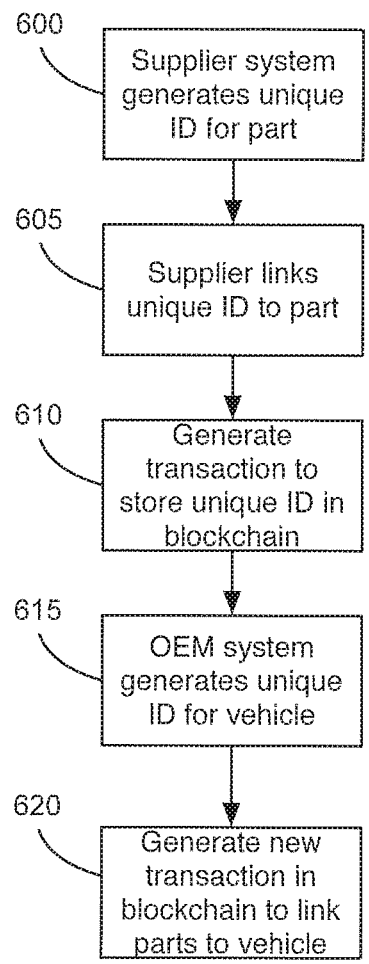
FIG. 6 illustrates exemplary operations that may be implemented by a component supplier and OEM system of the environment to incentivize using genuine OEM parts.

FIGS. 6 and 8 illustrate exemplary operations that may be implemented by the component supplier system, OEM system systems (105, 110) and/or the decentralized database 109 of the environment 100 to incentivize using genuine OEM parts and/or to document their use within a vehicle. The various operations may be implemented via instruction code executed by respective CPUs 225 of the systems (105, 110) for causing the CPUs 225 to perform the operations.

Referring to FIG. 6, at operation 600, a component supplier system 105 may generate a unique ID for a component. For example, the component supplier system 105 may generate a unique ID by randomly selecting a number from a very large number range where collisions of numbers are for all intents and purpose unlikely to occur. In some implementations, the component supplier system 105 may provide a user interface through which a user of the component supplier system 105 may request the unique number.

At operation 605, the component supplier may physically link the unique ID to a part. For example, the component supplier may be printed the unique ID on the part. In addition, or alternatively, the unique ID may be represented by a barcode, QR code, or a different code. In some implementations, an RFID with the code may be attached to or provided with the component to facilitate wirelessly scanning the unique ID of the component. In yet other implementations, the unique ID may be affixed or placed within the packaging of the component. In some implementations, the decentralized database 109 includes logic configured to create unique IDs that can be leveraged by other systems. In this case, the supplier system may request the unique ID from the logic of the decentralized database 109.

At operation 610, the component supplier system 105 may generate a transaction to store the unique ID in the distributed database 109. The transaction may include other information such as part name/type, a build date, cost, etc.

At operation 615, an OEM system 110 may generate a unique ID for a vehicle. For example, the OEM system 105 may generate a unique ID by hashing an encrypted master ID with a vehicle identification number (VIN) of the vehicle. In some implementations, the OEM system 110 may request the unique ID from the logic of the decentralized database 109 configured to create unique IDs.

At operation 620, the OEM system 110 may determine the components of the component suppliers used in the vehicle. The OEM system 110 may then store a transaction to the distributed database 109 to indicate that the components provided by the component supplier system 105 are associated with the unique ID of the vehicle.

FIG. 7A illustrates exemplary transactions that may be generated by the OEM system 110 to associate one or more components with a vehicle. Referring to the FIG. 7A, each transaction may include a source and destination address. The source address may be associated with a unique component and may have been generated and associated with the unique component at operation 610. The destination address may be associated with the unique ID of the vehicle.

A first exemplary transaction 705 is used to indicate that a first component at address T1M-C1 is associated with the vehicle at address OEM-V1. The first component in this case is Gear A and has the unique ID (CID) SN123456. The unique ID (VID) of the vehicle associated with address OEM-V1 is ABC123456. Likewise, a second exemplary transaction 710 is used to indicate that a second component at address T1M-C12 is associated with the vehicle at address OEM-V1.

In some cases, encrypted/hashed versions of the unique vehicle ID (VID) and unique component IDs (CIDs) are stored in the transaction database (235) rather than the unique vehicle ID (VID) and unique component IDs (CIDs) illustrated in the figure. Encrypting/hashing of the unique IDs guarantees privacy of vehicle and component information. This facilitates protecting information provided by different OEM and component suppliers. This in turn allows multiple OEMs/suppliers and data partners (e.g., insurance companies, vehicle history report providers (e.g., CarFax), fleet operators, etc.) to utilize the same environment without exposing information in the decentralized database that could potentially be used to determine confidential details about competing OEMs/Suppliers such as potential revenue, vehicle production volumes, etc.

The number of transactions stored to the distributed database 109 may correspond to the number of components in the vehicle. Components specified in the transactions may originate from the same or different component suppliers 105. In addition, transactions may be provided for transferring components of any of the suppliers to different vehicles manufactured by different OEMs.

FIG. 7B illustrates and exemplary listing of parts that may be associated with the vehicle upon processing the transactions of FIG. 7A. According to FIG. 7B, the vehicle associated with unique ID ABC123456 includes components Gear A and Gear B. Gear A has the unique ID SN123456 and Gear B has the unique ID SN654321.

Figure 8A:
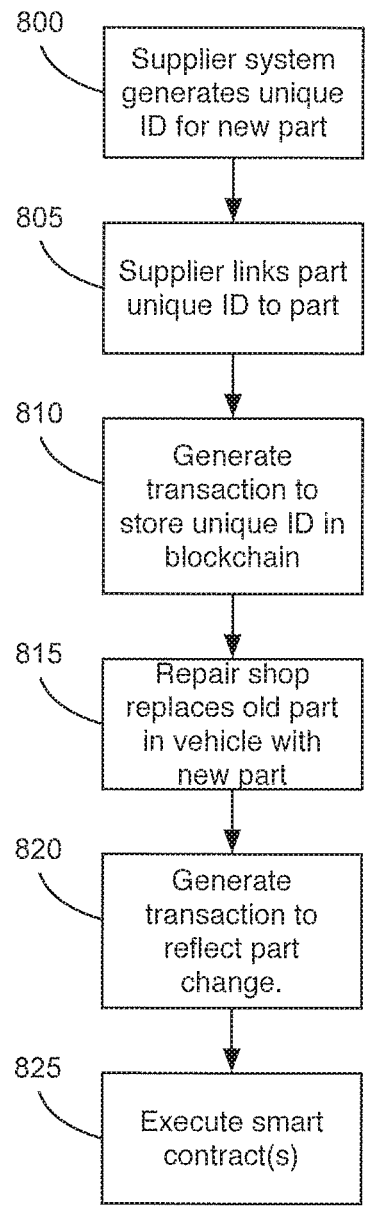
FIG. 8A illustrates additional exemplary operations that may be implemented by the component supplier and OEM systems of the environment to incentivize using genuine OEM parts.

Referring to FIG. 8A, at operation 800, a component supplier system 105 may generate a unique ID for a new component or request the unique ID from the logic of the decentralized database 109 configured to create unique IDs. At operation 805, the component supplier may physically link the unique ID to part.

At operation 810, the component supplier system 105 may generate a transaction to store the unique ID in the distributed database 109. The unique ID may be encrypted/hashed, as described above. The transaction may include one or more so-called smart contract. For example, a first smart contract may be configured to transfer fungible assets to, for example, a repair shop if the corresponding component is used. A second smart contract may be configured to provide an extended warranty with the new component.

At operation 815, a repair shop may need to replace a component in a vehicle with the new component. In this case, an operator at the repair shop may retrieve a replacement component from a part room of the repair shop. The operator may use the repair shop system 115 to determine whether the replacement part is genuine or non-approved. For example, the repair shop system 115 may include a scanner that facilitates scanning identifying information of the component. The identifying information may be in the form of a bar code, QR code, RFid tag, etc. that may be affixed to the component. The repair shop system 115 may then check whether the part is genuine or a non-approved part (e.g., a counterfeit and/or misfit part) by querying the decentralized database 109 for a component associated with the identifying information via, for example, the OEM system 119. If one is not found or a misfit part was found, the repair shop system 115 may indicate to the operator that the replacement component is a misfit or a counterfeit component (e.g., a non-approved component).

On the other hand, if the part is genuine and fits properly, the operator may indicate, via the repair shop system 115, to the OEM system 110 that the replacement part will be installed in a vehicle. In various embodiments, performing this step provides the requested verification that approved parts are used in the vehicle.

At operation 820, the OEM system 110 may generate a transaction to indicate that the new component (e.g., Gear A—SN333456) is associated with the vehicle (VID ABC123456).

At operation 825, the transaction may invoke the smart contracts if the data integrity is sufficient. The transaction invokes the smart contracts and returns only expected information, events, and/or behavior. The smart contract API may return error codes. In this case, no ledge update will be performed. Following the examples above, the repair shop may be provided with a rebate and an extended warranty may be provided with the new component.

Figure 8B:
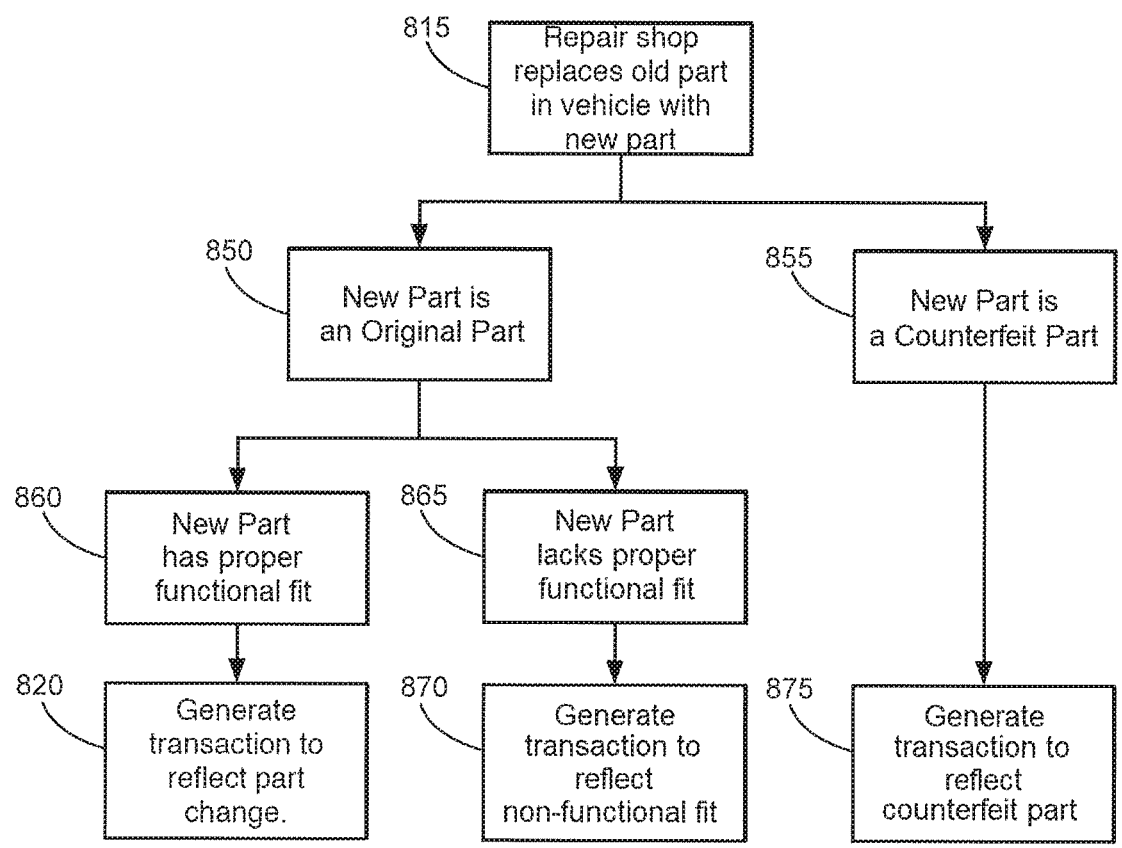
FIG. 8B illustrates additional details of the exemplary operations illustrated in FIG. 8A.

FIG. 8B illustrates additional details of the operations illustrated in FIG. 8A. As with FIG. 8A, at operation 815, a repair shop may need to replace a component in a vehicle with the new component. At operations 850 and 855, the repair shop system 115 determines if the new part is an original, genuine part (850) or a counterfeit part (855). For example, as discussed above with respect to FIG. 8A, the repair shop system 115 may query the decentralized database 109 for a component associated with the identifying information of the new part via, for example, the OEM system 119. If the new part is an original, genuine part (850), then repair shop system 115 determines if the new part has a proper functional fit (860) or lacks a proper functional fit (865). If the repair shop system 115 determines that new part is an original, genuine part (850) and has a proper functional fit (860), the repair shop system 115 may then generate the transaction to reflect the part change (820), as discussed with respect to FIG. 8A. However, if the repair shop system 115 determines that new part lacks a proper functional fit (865), the repair shop system 115 may then generate a transaction to reflect that the new part does not have proper functional fit (870). Similarly, if the repair shop system 115 determines that new part is a counterfeit part (855), the repair shop system 115 may then generate a transaction to reflect that the new part is a counterfeit part (875).

FIG. 9A illustrates additional exemplary transactions that may be generated based on the operations of FIGS. 8A and 8B. Referring to the FIG. 9A, a third exemplary transaction 905 is used to indicate that a new component at address T1M-C3 is associated with the vehicle at address OEM-V1. The new component in this case is Gear A and has the unique ID (CID) SN333456. A fourth transaction 910 may be generated based on a first smart contract of the transaction to provide an extended warranty to the vehicle. A fifth transaction 915 may be generated based on a second smart contract of the transaction to provide a rebate to the repair shop associated with destination address RS-R1.

FIG. 9B illustrates and exemplary listing of parts that may be associated with the vehicle upon processing the transactions of FIG. 9A. According to FIG. 9B, component Gear A with unique ID SN123456 has been replaced with a new Gear A having the unique ID SN333456.

Figure 10:
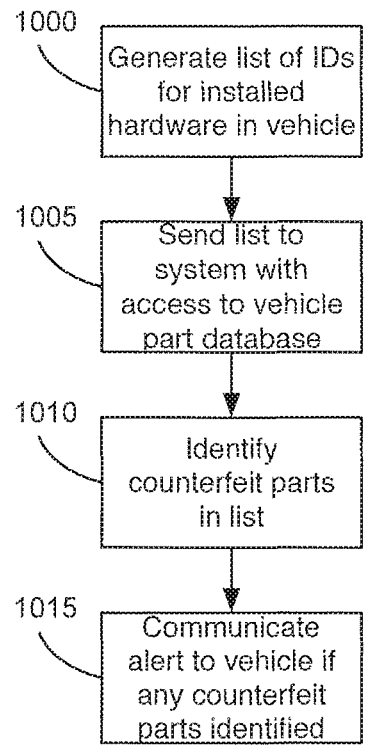
FIG. 10 illustrates exemplary operations that may be implemented by systems of the environment to facilitate detecting non-approved components in a vehicle.

FIG. 10 illustrates exemplary operations that may be implemented by systems of the environment 100 to facilitate detecting non-approved components in a vehicle. The various operations may be implemented via instruction code executed by respective CPUs 225 of one or more of the OEM and vehicle systems (110 and 120) for causing the CPUs 225 to perform the operations.

Referring to FIG. 10, at operation 1000, a vehicle system 120 may generate a list of installed hardware in the vehicle. For example, components of the vehicle may be in communication with the vehicle system 120. For example, the vehicle system 120 may correspond to an electronic control unit (ECU) that communicates with the components via a data bus such as a CAN bus. Each component may be associated with a unique ID. An instruction code agent of the vehicle system 120 may communicate with the components to determine the unique ID.

At operation 1005, the vehicle system 120 may communicate the list of component IDs to, for example, an OEM system 110 via an interface of the OEM system 110.

At operation 1010, the OEM system 110 may determine, based on information in the decentralized database 109, that one or more of the components in the list are not supposed to be installed in the vehicle and/or have not been defined in the decentralized database 109 by a component supplier 105.

At operation 1015, the OEM system 110 may communicate an alert to the vehicle system 120 related to detection of one or more non-approved components. The alert may be communicated to the end user of the vehicle via a warning indicator of the vehicle or the like.

In some instances, the OEM system 110 may be aware of safety concerns with the non-approved part or an OEM part installed in the vehicle. In this case, the OEM system may communicate instructions to the vehicle system 120 to prevent use of the vehicle after a predetermined number of warnings have been issued related to the safety concern. In addition, or alternatively, the OEM system 110 may communicate instructions to the vehicle system 120 to adjust operational parameters of the vehicle to mitigate the safety concerns. The vehicle system 120 may then adjust the parameters accordingly.

Figure 11:
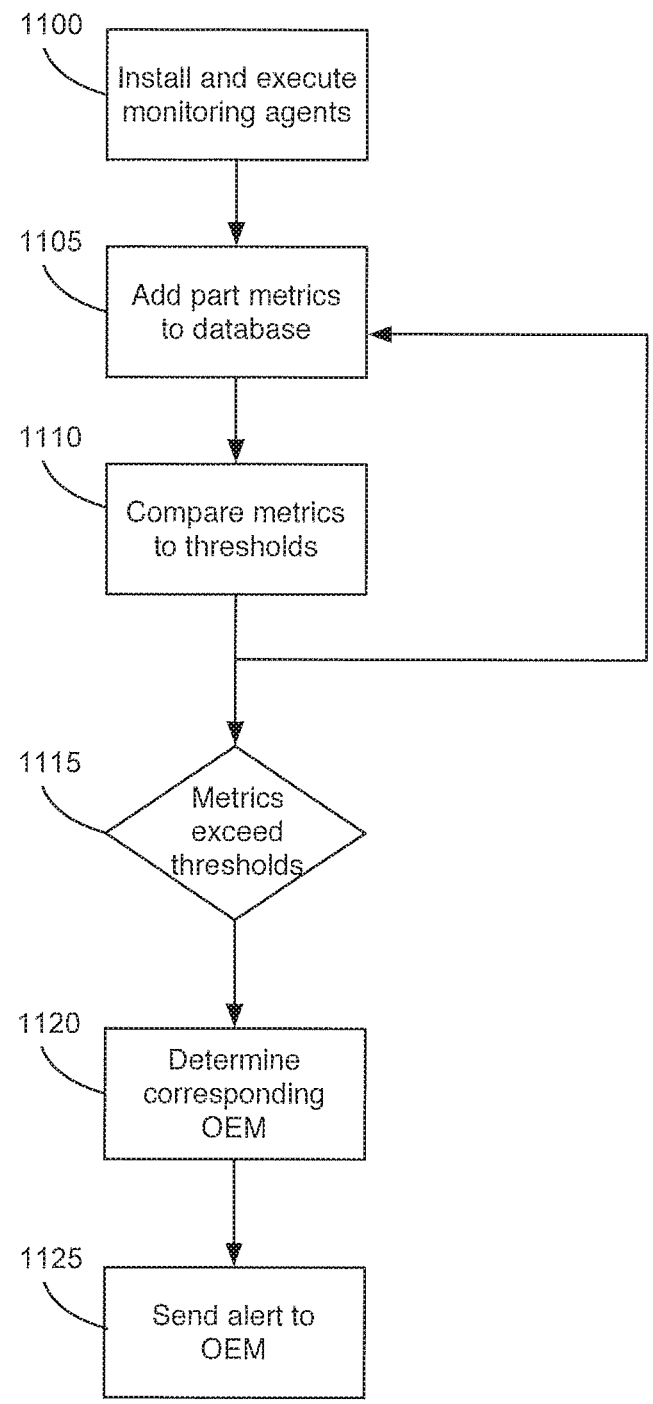
FIG. 11 illustrates exemplary operations for monitoring production of components made by a supplier and that are destined for a specific original equipment manufacturer (OEM)

FIG. 11 illustrates exemplary operations for monitoring production of components made by a supplier, and that are destined for a specific original equipment manufacturer (OEM). The various operations may be implemented via instruction code executed by respective CPUs 225 of one or more of the component supplier and OEM systems (105 and 115) for causing the CPUs 225 to perform the operations.

Referring to FIG. 11, at operation 1100, one or more instruction code agents for monitoring component metrics stored in a database may be installed on, for example, the component supplier system 105. The agents may be associated with a specific OEM 110. The OEM may have preapproved the operation and configuration of the agent. For example, the OEM may have specified one or more production thresholds against which component metrics are evaluated.

At operation 1105, the component supplier may generate a record in the database that specifies a plurality of production metrics associated with a component. The metrics may include an indication of a criticality of the component, sub-component information of the component, supplier information, a part number, manufacturing lot/batch information, a production part approval process associated with the component, etc. Records may be added for each component coming off the assembly line.

At operation 1110, each agent may determine whether metrics to be checked by the agent, and that are associated with the components, have exceeded one or more of the production thresholds used by the agent.

If at operation 1115, an agent determines that one or more metrics exceed a threshold, then at operation 1120, an OEM associated with the agent may be determined.

At operation 1125, and alert indicative of the threshold may be communicated to the OEM via, for example, a network connection to the OEM.

The operations in FIG. 11 may be performed in real-time, as component metrics are being added to the database. The operations allow an OEM relatively instant access to production metrics associated with components destined to the OEM. When alerts are issued, the OEM may determine that the component supplier is having production issues, which could result in products that are deficient in some way. This in turn may allow the OEM to quickly switch to a second source for the component, thus alleviating potential downtime in a factory of the OEM.

FIG. 12 illustrates a computer system 1200 that may form part of or implement the systems (105, 110, 115, 120, and/or 125) described above. The computer system 1200 may include a set of instructions 1245 that the processor 1205 may execute to cause the computer system 1200 to perform any of the operations or methods described above. The computer system 1200 may operate as a stand-alone device or may be connected, e.g., using a network, to other computer systems or peripheral devices.

In a networked deployment, the computer system 1200 may operate in the capacity of a server or as a client-user computer in a server-client user network environment, or as a peer computer system in a peer-to-peer (or distributed) network environment. The computer system 1200 may also be implemented as or incorporated into various devices, such as a personal computer or a mobile device, capable of executing the instructions 1245 (sequential or otherwise) that specify actions to be taken by that machine. Further, each of the systems described may include any collection of sub-systems that individually or jointly execute a set, or multiple sets, of instructions to perform one or more computer functions.

The computer system 1200 may include one or more memory devices 1210 on a bus 1220 for communicating information. In addition, code or instructions operable to cause the computer system to perform any of the operations and/or methods described above may be stored in the memory 1210. The memory 1210 may be a random-access memory, read-only memory, programmable memory, hard disk drive or any other type of memory or storage device.

The computer system 1200 may include a display 1230, such as a liquid crystal display (LCD), a cathode ray tube (CRT), or any other display suitable for conveying information. The display 1230 may act as an interface for the user to see the functioning of the processor 1205, or specifically as an interface with the software stored in the memory 1210 or in the drive unit 1215.

Additionally, the computer system 1200 may include an input device 1225, such as a keyboard or mouse, configured to allow a user to interact with any of the components of system 1200. Additionally, the input device 1225 may comprise a scanner, such as a camera, an optical sensor, a laser, a RFID reader, or any other device capable of scanning and/or sensing an identifying mark or signal on a replacement part.

The computer system 1200 may also include a disk or optical drive unit 1215. The disk drive unit 1215 may include a computer-readable medium 1240 in which the instructions 1245 may be stored. The instructions 1245 may reside completely, or at least partially, within the memory 1210 and/or within the processor 1205 during execution by the computer system 1200. The instructions 1245, when executed by the processor 1205, may cause the processor 1205 to perform any of the operations and/or methods discussed herein. The memory 1210 and the processor 1205 also may include computer-readable media as discussed above.

The computer system 1200 may include a communication interface 1235 to support communications via a network 1250. The network 1250 may include wired networks, wireless networks, or combinations thereof. The communication interface 1235 network may enable communications via any number of communication standards, such as 802.11, 802.12, 802.20, WiMAX, cellular telephone standards, Bluetooth, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a non-transitory computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made, and equivalents may be substituted without departing from the scope of the claims. Many other modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method of communicating with a vehicle repair facility, the method comprising:
    receiving, by at least one server from a vehicle, an indication that the vehicle requires repair;
    receiving, by the at least one server from the vehicle, communication regarding a vehicle location, wherein the vehicle location corresponds to a location of the vehicle repair facility;
    determining, by the server, the vehicle repair facility as corresponding to the vehicle location;
    determining, by the server, contact information for the vehicle repair facility; and
    contacting, by the server, the vehicle repair facility via the contact information with a message regarding repairs required for the vehicle, wherein the message includes a request for confirmation from the vehicle repair facility to verify use of authentic parts for the repairs required for the vehicle.

2. The method of claim 1, further comprising:
    failing to receive a confirmation from the vehicle repair facility regarding verifying the use of authentic parts for the repairs required for the vehicle; and
    causing a message to be displayed on an infotainment system of the vehicle regarding the failure of the vehicle repair facility to verify the use of authentic parts for the repairs required for the vehicle.

3. The method of claim 2, further comprising:
    receiving, by the server from the vehicle, an acknowledgment that a vehicle user has read the message displayed on the infotainment system of the vehicle regarding the failure of the vehicle repair facility to verify the use of authentic parts for the repairs required for the vehicle; and
    storing, by the server, a log of the receipt of the acknowledgement.

4. The method of claim 1, further comprising:
    failing to receive, by the server, a confirmation from the vehicle repair facility regarding verifying the use of authentic parts for the repairs required for the vehicle;
    determining, by the server, user contact information for a registered user of the vehicle; and
    contacting the registered user of the vehicle via the user contact information regarding the failure to receive the confirmation from the vehicle repair facility regarding verifying the use of authentic parts for the repairs required for the vehicle.

5. The method of claim 1, further comprising:
    storing, by the server, a log of the failure to receive the confirmation from the vehicle repair facility regarding verifying the use of authentic parts for the repairs required for the vehicle in a database associated with the vehicle and the vehicle repair facility.

6. The method of claim 1, further comprising:
    receiving, by the at least one server from a scanning device, scanned information correlating to a replacement part for the vehicle;
    determining whether the scanned information is associated with an authentic part; and
    storing in a database a result of the determination of whether the scanned information is associated with an authentic part.

7. The method of claim 1, wherein receiving, by the at least one server from the vehicle, the indication that the vehicle requires repair comprises receiving an indication that the vehicle has been in an accident.

8. The method of claim 1, wherein receiving, by the at least one server from the vehicle, the indication that the vehicle requires repair comprises receiving an indication that at least one airbag of the vehicle has deployed.

9. The method of claim 1, wherein receiving the vehicle location comprises receiving GPS location information from the vehicle.

10. The method of claim 1, further comprising:
    receiving, by the server, an acknowledgment from a registered user of the vehicle regarding the use of non-authentic parts for the repairs required for the vehicle; and
    storing, by the server, a log of the receipt of the acknowledgement.

11. A system for communicating with a vehicle repair facility, the system comprising:
    instruction code storage; and
    a processor in communication with the instruction code storage, wherein the instruction code storage stores instructions that, when executed by the processor, cause the processor to perform a method comprising:
        receiving from a vehicle an indication that the vehicle requires repair;
        receiving from the vehicle communication regarding a vehicle location;
        determining the vehicle repair facility as corresponding to the vehicle location;
        determining contact information for the vehicle repair facility; and
        contacting the vehicle repair facility via the contact information with a message regarding repairs required for the vehicle, wherein the message includes a request for confirmation from the vehicle repair facility to verify use of authentic parts for the repairs required for the vehicle.

12. The system of claim 11, wherein the instructions, when executed by the processor, cause the processor to perform the method further comprising:
    determining a failure to receive a confirmation from the vehicle repair facility regarding verifying the use of authentic parts for the repairs required for the vehicle; and
    causing a message to be displayed on an infotainment system of the vehicle regarding the failure of the vehicle repair facility to verify the use of authentic parts for the repairs required for the vehicle.

13. The system of claim 11, wherein the instructions, when executed by the processor, cause the processor to perform the method further comprising:
- determining a failure to receive a confirmation from the vehicle repair facility regarding verifying the use of authentic parts for the repairs required for the vehicle;
- determining user contact information for a registered user of the vehicle; and
- contacting the registered user of the vehicle via the user contact information regarding the failure to receive the confirmation from the vehicle repair facility regarding verifying the use of authentic parts for the repairs required for the vehicle.

14. The system of claim 13, wherein the instructions, when executed by the processor, cause the processor to perform the method further comprising:
- contacting the registered user of the vehicle via the user contact information with a message including a request for the registered user of the vehicle to verify use of authentic parts for the repairs required for the vehicle;
- determining a failure to receive an acknowledgement from the registered user of the vehicle regarding the request for the registered user of the vehicle to verify use of authentic parts for the repairs required for the vehicle; and
- storing, by the server, a log of the failure to receive the acknowledgement.

15. The system of claim 11, wherein the instructions, when executed by the processor, cause the processor to perform the method further comprising:
- logging the failure to receive the confirmation from the vehicle repair facility regarding verifying the use of authentic parts for the repairs required for the vehicle in a database associated with the vehicle and the vehicle repair facility.

16. The system of claim 11, wherein the instructions, when executed by the processor, cause the processor to perform the method further comprising:
- receiving from a scanning device scanned information correlating to a replacement part for the vehicle;
- determining whether the scanned information is associated with an authentic part; and
- storing in a database a result of the determination of whether the scanned information is associated with an authentic part.

17. The system of claim 11, wherein receiving from the vehicle the indication that the vehicle requires repair comprises receiving an indication that the vehicle has been in an accident.

* * * * *